United States Patent Office 3,006,967
Patented Oct. 31, 1961

3,006,967
TRICHLORINATED BENZYLOXYALKANOLS
Jack S. Newcomer, Wilson, Edward D. Weil, Lewiston, Edwin Dorfman, Grand Island, and Jerome Linder, Niagara Falls, N.Y., assignors to Hooker Chemical Corporation, Niagara Falls, N.Y., a corporation of New York
No Drawing. Filed Feb. 4, 1959, Ser. No. 791,015
2 Claims. (Cl. 260—611)

This invention relates to new compositions of matter known as benzyloxyalkanols.

The present invention resides in the concept of specific compounds of said class of substances having valuable properties as fire retardants, plasticizer intermediates, herbicides and as intermediates for the production of other compounds. These compositions of matter comprise trichlorinated benzyloxyalkanols having properties not predictable from the established properties of related compounds.

These compounds can be prepared in the following manner:

The compounds of this invention are prepared by the chlorination of toluene or a chlorotoluene to introduce three chlorine atoms in the ring, then one chlorine atom in the side chain, followed by reaction of the trichlorobenzyl chloride with a molar excess of a compound of the structure HO—X—OH in the presence of an acid acceptor. X is an alkylene radical having at least two carbon atoms. Other methods of synthesis may be used, as for example, the above route modified by starting with a specific isomer of mono-, di-, or tri-chlorotoluene. These compositions cannot readily be prepared by chlorination of related unchlorinated analogs.

It is one object of this invention to supply compounds having valuable combinations of biological properties.

Another object of the invention is to make available a series of alcohols which may be used as chemical intermediates in the production of esters useful as plasticizers.

A still further object is to make available a series of alcohols which may be used as chemical intermediates in the preparation of easily formulated esters of common herbicides such as 2,4-dichlorophenoxyacetic acid, and which at the same time contribute substantially to the herbicidal action of said esters.

Additional objects will become apparent upon a further reading of this specification.

The compositions of this invention are described by the general formula:

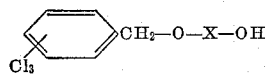

wherein X is an alkylene radical of at least two carbon atoms, which may be unsubstituted or substituted by oxa-, hydroxy-, alkyl or hydroxyalkyl groups. Oxa-substituted alkylene radicals are also known as alkylene-oxy-alkylene radicals.

The trichlorophenyl group may have the 2,3,4-, 2,3,6-, 2,4,5-, 2,4,6-, or 3,4,5-configuration. The preferred compositions are the mixtures of isomers which result from the mode of manufacture from toluene or o-chlorotoluene which will be described in the examples below. Some representative examples of the group X are ethylene, trimethylene, tetramethylene, 1,2-propylene, 1,2-butylene, 1,3-butylene, 2,3-butylene, amylene, hexylene, 2-hydroxyl-1,3-propylene, 2,3,4,5-tetrahydroxy-1,6-hexylene, 2-hydroxymethyl-2-methyl - 1,3 - propylene, 2,2-di(hydroxymethyl)-1,3-propylene, 3-oxa-1,5-pentylene, 3,6-dioxa-1,8-octylene, and 2,5-dimethyl-3-oxa-1,5-pentylene.

The compounds of the invention are low melting waxy solids or syrups, and the esters thereof have low volatility and possess compatibility with many synthetic resins, imparting plasticity and flame resistance thereto.

The compounds of the invention having a reactive alcohol function, are useful as chemical intermediates. They may readily be esterified to yield esters which are useful as plasticizers and biological toxicants. For example, they may be esterified with trichloroacetic acid, α,α-dichloropropionic acid, trichloropropionic acid, 2,4-dichlorophenoxyacetic acid or homologs thereof to produce esters to which the alcohol moiety imparts additional herbicidal activity.

The following examples illustrate the invention herein described. The nature and utility of the compounds of this invention shown in the examples are meant to illustrate, not limit, the scope of the invention.

EXAMPLE 1

This example shows the preparation and analysis of the compositions above described; the members of the X group in the above-shown general formula are indicated in the first column of the chart below.

Toluene was chlorinated at sixty to seventy degrees centigrade in the presence of 0.1 percent ferric chloride as a catalyst until the weight uptake indicated about 2.5 moles of chlorine had reacted. The product was distilled and the fraction boiling one hundred and twenty to one hundred and forty degrees centigrade (20 mm.) was taken. Analysis by infrared indicated an isomer content of thirty-five to forty percent 2,4,5-, forty to fifty percent 2,3,6-, and ten to fifteen percent 2,3,4-trichlorotoluene. This trichlorotoluene was chlorinated at one hundred to two hundred degrees centigrade under irradiation by a mercury vapor lamp until 0.7 to 0.8 mole of hydrogen chloride per mole of trichlorotoluene was evolved. This product was fractionated to obtain the trichlorobenzyl chloride fraction, boiling point one hundred and thirty-one to one hundred and fifty-two degrees centigrade (6 mm.). This trichlorobenzyl chloride was added with stirring to 1.5 molar equivalents of caustic soda in a molar excess of the chosen glycol, at one hundred and forty to one hundred and fifty degrees centigrade, and the reaction mixture heated and stirred for about three hours. The mixture was then poured into water, exhaustively extracted with toluene, and the toluene extracts combined and distilled under reduced pressure to obtain the desired product. Infrared analysis shows these products to have substantially the same isomer distribution as the trichlorotoluene intermediate.

| Group —X— | Glycol Employed | Description of Product | Analysis Cl. Calcd. | Cl. Found |
|---|---|---|---|---|
| 1. —CH$_2$CH$_2$— | Ethylene glycol | Semi solid, B.P. 181–192° C. (6 mm.). | 41.6 | 41.2 |
| 2. —CH$_2$CH$_2$CH$_2$—CH$_2$— | 1,4-butane-diol | Viscous syrup, B.P. 140–168° C. (0.25 mm.). | 37.6 | 37.3 |
| 3. —CH$_2$CH(CH$_3$)— | 1,2-propane-diol | Viscous syrup B.P. 145–160° C. (0.5 mm.). | 39.5 | 37.9 |
| 4. —CH$_2$CHOH—CH$_2$— | glycerol | Very viscous syrup decomp. on dist. | 37.5 | 39.3 |
| 5. —CH$_2$CH$_2$—OCH$_2$CH$_2$— | diethylene glycol | Viscous syrup, B.P. 175–185° C. (0.05 mm.). | 35.5 | 34.0 |
| 6. —CHCH(CH$_3$)—OCH$_2$CH(CH$_3$)— | dipropylene glycol | Viscous syrup, B.P. 180–185° C. (0.05 mm.). | 32.5 | 32.7 |
| 7. —CH(CH$_3$)CH—CH(CH$_3$)— | 2,3-butane-diol | Viscous syrup, B.P. 170–176° C. (5 mm.). | 37.7 | 42.0 |
| 8. —CH$_2$CH$_2$—CH(CH$_3$)— | 1,3-butane-diol | Viscous syrup, B.P. 171–182° C. (5 mm.). | 37.7 | 37.3 |
| 9. —(CH$_2$CH$_2$O)$_2$—CH$_2$CH$_2$— | triethylene glycol | Viscous syrup, B.P. 210–250° C. (0.38 mm.). | 31.0 | 28.8 |
| 10. —CH$_2$CH$_2$—[1] | ethylene glycol | Semi solid, B.P. 175–190° C. (5 mm.). | 41.6 | 41.0 |

[1] As composition 1 but prepared from orthochlorotoluene (infrared analysis shows 60 to 70 percent 2,3,6-isomer and 30 to 40 percent 2,4,5-isomer.)

EXAMPLE 2

*Preparation of 2-(2,3,6-trichlorobenzyloxy) ethanol*

2,3,6-trichlorotoluene prepared by the method of Brimelow, Jones, and Metcalf (J. Chem. Soc. 1951, 1208), is chlorinated at one hundred to one hundred and twenty degrees centigrade under irradiation by a mercury vapor lamp until 0.7 to 0.8 mole of hydrogen chloride per mole of the toluene is evolved. The resultant 2,3,6-trichlorobenzyl chloride, boiling point one hundred and fifty to one hundred and fifty-five degrees centigrade (18 mm.), is separated from unreacted 2,3,6-trichlorotoluene by fractionation. A solution of forty-four parts of caustic soda in two hundred and fifty parts of ethylene glycol is prepared by warming to one hundred and eighty-five degrees centigrade, then cooled to one hundred and forty-five degrees centigrade, and one hundred and fifteen parts of 2,3,6-trichlorobenzyl chloride is added. After three hours at one hundred and forty-five to one hundred and fifty degrees centigrade, the reaction mixture is mixed with two thousand parts of water and one thousand parts of toluene; the toluene layer then separated and fractionated, yielding sixty-five parts of 2-(2,3,6-trichlorobenzyloxy) ethanol, boiling point one hundred and eighty-one to one hundred and ninety-two degrees centigrade (6 mm.).

*Analysis.*—Calcd. for C$_9$H$_9$Cl$_3$O$_2$: Cl, 41.6. Found: Cl, 41.2.

EXAMPLE 3

The method of Example 2 was used, except that the starting material was 2,4,5-trichlorotoluene. The product was a waxy solid, boiling point one hundred and fifty-five to one hundred and sixty-two degrees centigrade (0.75 mm.).

EXAMPLE 4

The use of the compounds of the invention as herbicides is illustrated by the following example:

On an area in Niagara County, New York, infested with field bindweed, the compositions having the X groups of CH$_2$CH$_2$ and CH$_2$CH(CH$_3$) designated as the first and third compound in Example 1 were applied at twelve pounds per acre, emulsified in eight hundred gallons per acre of water.

Three months later, the treated areas were inspected and found to be free of live bindweed growth. Sodium chlorate at one thousand pounds per acre was required to give similar results.

EXAMPLE 5

The use of the compounds of the invention as plasticizer intermediates is illustrated by the following examples:

Composition 1 as Example 1 (CH$_2$CH$_2$ is the X group), was converted to the corresponding trichloroacetate by refluxing with a molar equivalent of trichloroacetic acid in the presence of toluene which functioned as a water entrainment agent. The trichloroacetate thus produced boiled at one hundred and twenty-five degrees centigrade (0.15 mm.).

A mixture was made of equal parts by weight of Geon 121 (a commercial polyvinyl chloride resin) and the above ester, and the ingredients were melted together at one hundred and eighty-six degrees centigrade. The resultant plasticized resin was rubbery and translucent, and did not support combustion.

A plasticized resin made from equal weights of Geon 121 and dioctyl phthalate (a common commercial plasticizer) supported combustion.

EXAMPLE 6

Use of the compounds of the invention as intermediates is illustrated by the following example:

A mixture containing one hundred and twenty-eight parts of trichlorobenzoxyethanol, three hundred parts 2,4-dichlorophenoxyacetic acid, eight parts concentrated sulfuric acid and nine hundred parts toluene is heated to reflux. A water separator is used to remove the water of reaction. After eight hours the reaction was complete. The reaction mixture made basic with sodium carbonate was complete. The reaction mixture made basic with sodium carbonate solution and filtered. The toluene layer was separated off and washed with water. The toluene was then distilled off leaving a viscous syrup. Percentage chlorine calculated for trichlorobenzyloxyethyl 2,4-dichlorophenylacetate, 38.8 percent; found 37.7 percent.

The product is also a herbicide of low volatility and of higher herbicidal activity than the ordinary alkyl and alkoxyalkyl esters of 2,4-dichlorophenoxyacetic acid. At twenty pounds per acre, field bindweed (*Convolvulus arvensis*) is completely controlled whereas substantially no control was obtained with the butoxyethyl ester of 2,4-dichlorophenoxyacetic acid at the same rate.

The examples of the compositions of our invention, and methods of preparing and utilizing them which have been described in the foregoing specification, have been given for purposes of illustration, not limitation. Many other modifications and ramifications will naturally suggest themselves to those skilled in the art, based on the disclosure of our basic discovery. These are intended to be comprehended within the scope of our invention.

We claim:
1. Compounds having the general formula:

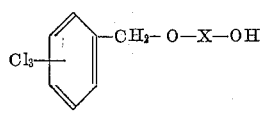

wherein X is a member selected from the group consisting of alkylene, alkylene-oxy-alkylene, and hydroxyalkylene radicals, said radicals containing a total of from two to six carbon atoms inclusive.

2. Compounds according to claim 1 wherein X is alkylene.

References Cited in the file of this patent

UNITED STATES PATENTS

| | | |
|---|---|---|
| 2,665,291 | Fishback | Jan. 5, 1954 |
| 2,799,694 | Ross et al. | July 16, 1957 |

OTHER REFERENCES

Ludwig et al.: Jour. Amer. Chem. Soc., vol. 74 (1952), pp. 1935–1939.